Figure 1:
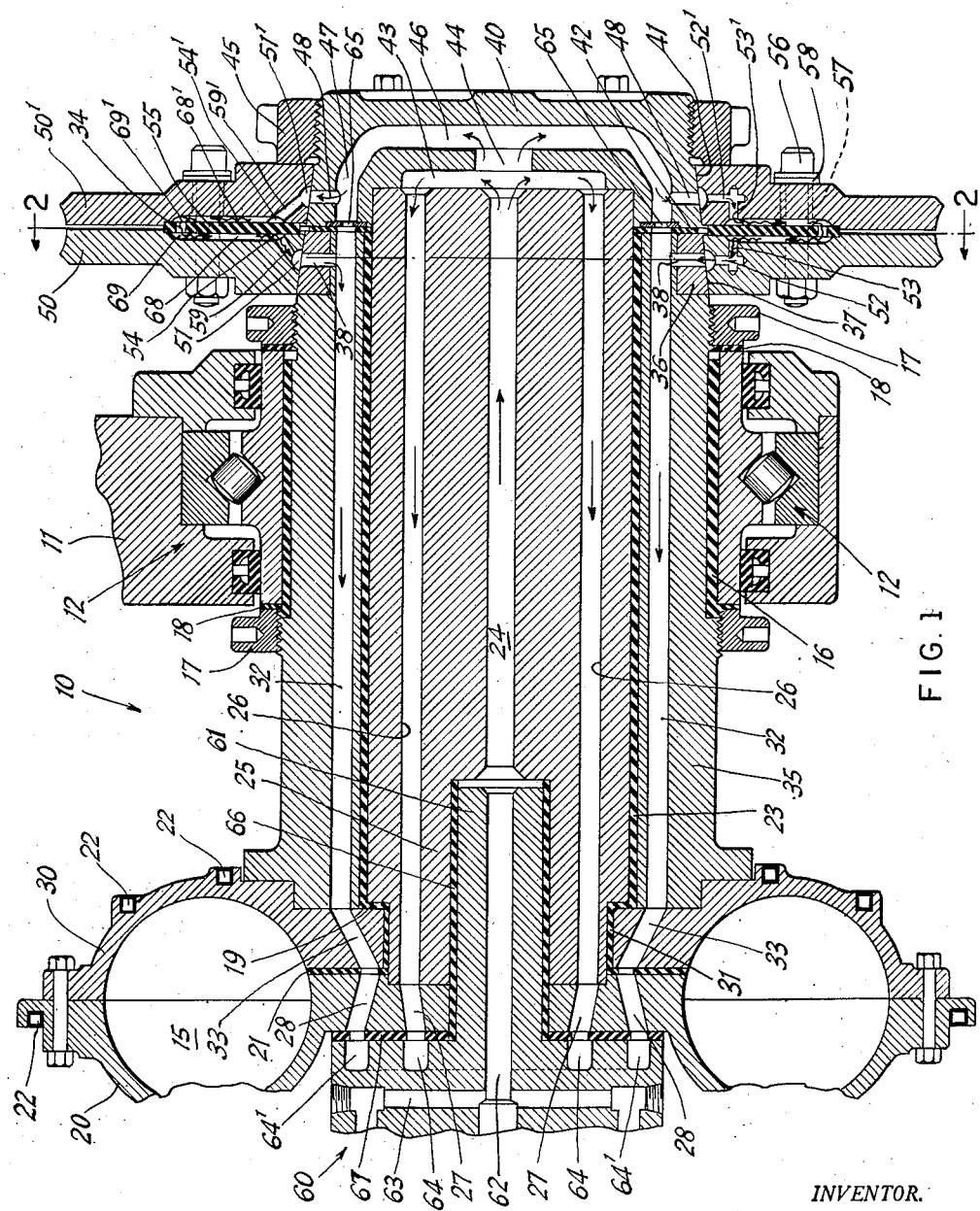

July 16, 1957 E. W. ALLARDT 2,799,768
INTERNALLY COOLED RESISTANCE WELDER ELECTRODES
Filed June 18, 1956 2 Sheets-Sheet 2
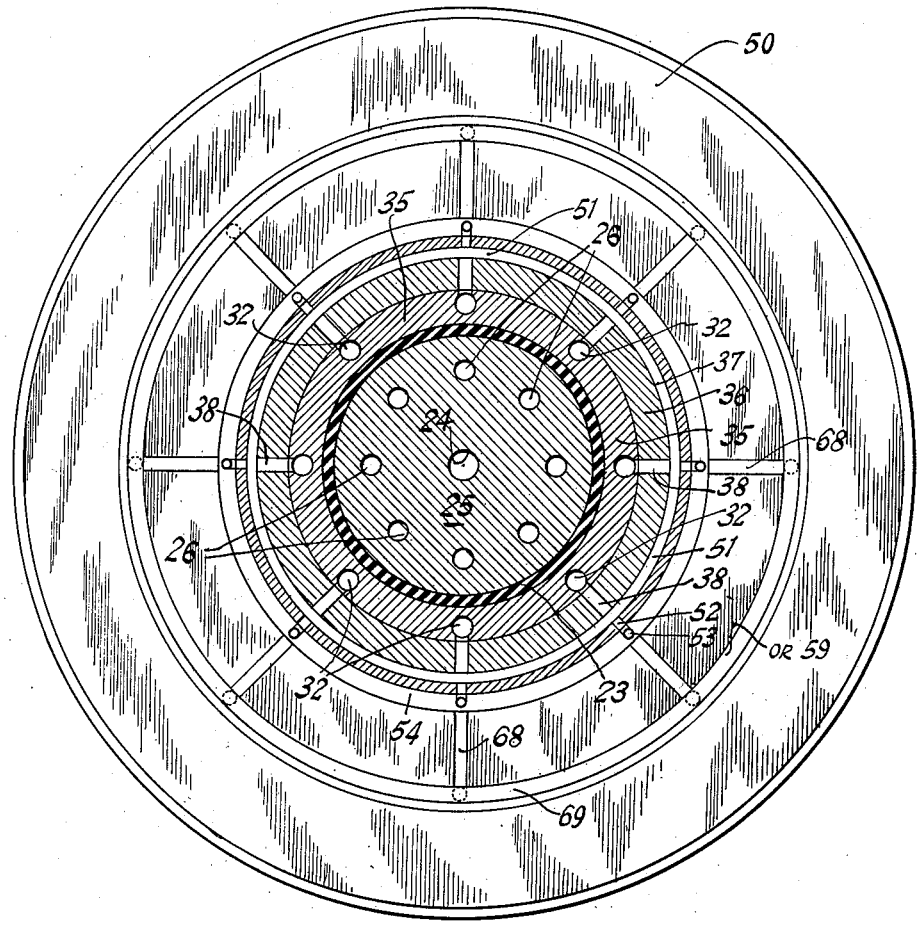
FIG. 2
INVENTOR.
Ernst W. Allardt
BY
ATTORNEY

United States Patent Office 2,799,768
Patented July 16, 1957

2,799,768
INTERNALLY COOLED RESISTANCE WELDER ELECTRODES

Ernst W. Allardt, Alliance, Ohio, assignor to The Babcock & Wilcox Company, New York, N. Y., a corporation of New Jersey Application June 18, 1956, Serial No. 592,029

12 Claims. (Cl. 219—63)

This invention relates to resistance welding apparatus and, more particularly, to novel means for cooling the welding electrodes of a rotary welding transformer for resistance welding longitudinal seams, for example in the manufacture of electric resistance welded tubing familiarly known as "ERW" tubing.

In the manufacture of such tubing, an elongated strip of skelp is fed through a series of forming rolls which progressively shape the strip into the form of a tube having an open slit extending longitudinally thereof. The thus formed tubing is then progressively fed into operative relationship with a pair of welding electrodes, each of which engages the tubing on opposite sides of the abutting edges of the seam. A relatively heavy current is passed from one electrode to the other electrode through the abutted edges of the tube, these edges being forced into engagement under pressure by suitable squeeze rolls. The heat created by the resistance to the flow of electric current across the abutted tube edges forms a resistance weld closing the tube.

Various arrangements have been proposed and tried for conducting the relatively heavy electric currents to the rotating welding electrodes. Such arrangements include rotary welding transformers in which the electrodes are secured to the transformer, the two electrodes being electrically connected to opposite polarity "terminals" of the transformer secondary circuit.

In my U. S. Patent No. 2,666,121, issued January 12, 1954, there is disclosed and claimed a novel rotary welding transformer in which the electrodes are mounted on tapered mounting surfaces on the outer end of a tubular single turn secondary winding. The inner and outer electrodes are bolted together, with a dielectric disk therebetween, to form an electrode unit which is then mounted on the tapered mounting surfaces. The dielectric disk is so chosen as to provide the desired electrical insulation between the electrodes. A nut threaded on the outer end of the tubular secondary forces the electrode unit into firm seating engagement on the mounting surfaces.

The respective mounting surfaces for the two electrodes are electrically insulated from each other and constitute the opposite polarity terminals of the single turn secondary winding of the rotary welding transformer.

Due to the relatively heavy currents requisite to electric resistance welding of the closing seam of the tubing, considerable heat is developed in the transformer, particularly in the single turn secondary circuit thereof. The rotary welding transformer of said patent includes means for providing forced circulation of liquid coolant through the primary and secondary windings of the transformer. Such means includes circumferentially spaced longitudinal passages through the telescoped, electrically conductive cylindrical members forming the main elements of the secondary winding. These passages form return flow conduits for the liquid coolant entering the secondary winding through an axial passage in the inner member and connected to the return flow passages by suitable means including cross or radial passages.

With this arrangement, the electrodes, which are assembled as a unit with their dielectric separating disk on the tapered electrode mounting surfaces, are cooled by metal-to-metal conduction due to their seating engagement on the liquid-cooled mounting surfaces. However, under certain operating conditions and with some electrodes, such heat conduction from the electrodes into their mounting surfaces is insufficient to prevent warpage of such electrodes due to heat.

In accordance with the present invention, such warpage is eliminated by causing the liquid coolant to circulate in direct contact with the electrodes, such direct liquid cooling of the electrodes being possible by virtue of the unitary assembly of the electrodes and their dielectric separating disk before the electrode unit is mounted on the tapered electrode mounting surfaces.

More specifically, each electrode is provided with a circumferential channel around its inner periphery or seating surface connected by circumferentially spaced passages to a circular, outwardly opening inner channel in the disk engaging surface of the electrode. This latter channel is connected by circumferentially spaced radial channels to an outer, circular, outwardly opening channel. Adjacent its outer periphery, the dielectric separating disk has circumferentially spaced transverse apertures interconnecting the outer circular channels of the two electrodes engaged therewith.

The circumferential channels in the inner peripheries of the two electrodes are arranged to register with radial passages through the respective electrode seating surfaces, these radial passages opening into the return flow coolant conduits or passages in the telescoped cylindrical elements. There are thus two sets of these radial passages opening into the coolant conduits in longitudinally spaced relation. Coolant flow into and through the electrode channels and passages is assured by the use of flow restricting means in each coolant conduit between the two radial passages opening thereinto.

For an understanding of the invention principles, reference is made to the following description of typical embodiments thereof as illustrated in the accompanying drawings. In the drawings:

Fig. 1 is a partial axial sectional view through a rotary seam welding transformer illustrating two embodiments of the electrode coolant circulating means; and Fig. 2 is a sectional view on the line 2—2 of Fig. 1.

Referring to the drawings, the rotary seam welding transformer 10 therein illustrated is, except for the electrode cooling arrangement, similar or identical in all essential respects to that disclosed in U. S. Patent No. 2,666,121 and reference is made to this patent for such parts of the transformer as are not shown in the instant drawings. For example, the transformer primary winding and magnetic core, and the external cooling and electrical constructions and connections have not been shown as they form no part of the present invention.

Transformer 10 is rotatably supported in a sturdy bracket 11 by means of an anti-friction bearing assembly 12. An insulating sleeve 16 is disposed between bearing assembly 12 and transformer 10, and rings 17 threaded on the transformer on either side of assembly 12, and separated therefrom by annular insulating disks 18, adjustably position transformer 10 longitudinally or axially relative to bracket 11.

The single turn secondary winding of transformer 10 includes a pair of complementary housing sections 20, 30, of electrically conductive metal, secured together, with their inner ends separated by a dielectric insulating disk 21, to form a housing enclosing a toroidal cavity 15 in which are mounted the transformer primary winding and magnetic core (not shown). Conduits 22, for the circulation of coolant, are set into housing sections 20 and 30.

Housing section 20 is secured, in electrically conductive relation, to an inner cylindrical member 25, and housing section 30 is similarly secured to an outer cylindrical member 35. Members 25 and 35 are telescoped on each other with an insulating sleeve 23 disposed therebetween. An insulating sleeve 31 and an insulating disk 19 electrically isolate section 30 from member 25.

The outer end of member 35 has a recess therein seating a trapezoidal bearing ring 36 having a frusto-conical outer surface 37 at a small angle to the transformer axis and serving as a seat for inner electrode 50. A cap 40 is bolted to and extends over the outer end of inner member 25 and has a frusto-conical surface 41 forming a smooth continuation of surface 37 and serving as a seat for outer electrode 50'. An insulating disk 42 is placed between the adjacent surfaces of member 35 and cap 40.

Electrodes 50 and 50' have frusto-conical inner peripheries matching their respective seating surfaces 37 and 41. The mating electrodes are secured together, with an insulating disk 55 therebetween, by bolt and nut assemblies 56 electrically isolated from electrode 50' by insulating sleeves 57 and insulating washers 58. The assembled unit of the two electrodes and the disk is mounted on the transformer by slipping it onto seats 37, 41 and then drawing the unit into tight seating relation on its tapered seating surfaces by a nut 45 threaded onto cap 40.

As described in the above-mentioned U. S. patent, member 25 is formed with a relatively larger diameter, axial, coolant inlet passage 24 and smaller diameter, circumferentially spaced, coolant return passages 26 communicating with passages 27 through housing member 20. Member 35 is formed with circumferentially spaced coolant return passages 32 communicating with passages 33 through housing member 30, these latter passages communicating with passages 28 through housing member 29.

The inner surface of cap 40 is formed with radial channels 43 connecting passages 24 to passages 26. An axial passage 44 in cap 40 connects channels 43 to radial passages 46, in the cap, having longitudinal extensions 47 communicating with passages 32 in member 35.

Coolant flow connections to the transformer are made by means of a manifold 60 having an axial, tubular extension 61 seated in an axial recess in the end of member 25 and communicating with passage 24. As described in the above-mentioned patent, a coolant inlet conduit communicates with passage 62 in extension 61, and radial passages 63 connect passage 62 to connections leading to the conduits 22 in the housing sections 20 and 30. The inner surface of manifold 60 has a pair of circular channels 64, 64' respectively communicating with passages 27 and 28 in member 20, channels 64, 64' being connected to coolant return connections as described in the above-mentioned patent. An insulating sleeve 66 and an insulating disk 67 electrically isolate manifold 60 from transformer 10. It will be noted that all of these insulating disks intersecting coolant passages are suitably apertured at the passages.

In accordance with the invention, at least a part of the coolant flow through passages 32 in member 35 is forced to flow in heat absorbing relation with electrodes 50, 50'. For this purpose, circumferentially spaced radial passages 38 and 48 are formed, respectively, through ring 36 and its seat on member 35 and through the electrode seating portion of cap 40, passages 38 and 48 communicating at their inner ends with passages 32 and passage extensions 47 and opening into seating surfaces 37 and 41 respectively. The inner end of cap 40 has a circular recess seating a flat metal ring 65 formed with flow restricting orifices each aligned with a passage extension 47. Ring 65 engages sponge rubber gasket 42.

Electrodes 50, 50' have circumferential channels 51, 51', in their inner peripheries or seats, communicating with passages 38 and 48, respectively, the width of these channels being substantially greater than the diameter of passages 38 and 48. Thereby, the position of the electrodes on their seating surfaces is not critical with respect to aligning the channels 51, 51' with passages 38 and 48, respectively.

In the arrangement illustrated in the lower half of the right end of Fig. 1, radial passages 52, 52' connect channels 51, 51' to cross passages 53, 53' communicating with the inner circular channels 54, 54' in the inner faces of electrodes 50, 50'. In the alternative arrangement shown in the upper half of the right end of Fig. 1, diagonal passages 59, 59' connect channels 51, 51' to channels 54, 54'.

In both arrangements, radial channels 68, 68' connect inner circular channels 54, 54' to outer circular channels 69, 69'. Circumferentially spaced apertures 34 in disk 55 interconnect channels 69 and 69'.

With the described arrangements, at least a part of the coolant flowing in passages 46 and 47 is, by virtue of the flow restricting orifices in ring 65, forced to flow through passages 48, channel 51', passages 52', 53' (or passages 59'), channel 54', radial channels 68', channel 69', apertures 34, channel 69, channels 68, channel 54, passages 53, 52 (or passages 59), channel 51, and passages 38 into passages 32 downstream of members 65. Thus, the electrodes 50, 50' are adequately cooled, by the flow of liquid coolant, under all conditions, and warpage and distortion is prevented.

While specific embodiments of the invention have been shown and described in detail to illustrate the application of the invention principles, it will be understood that the invention may be embodied otherwise without departing from such principles.

What is claimed:

1. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said body structure with each electrode engaging a different one of said seating surfaces; coolant circulating means provided in said assembly; and means connecting opposite ends of said coolant circulating means to said passage means for circulation of coolant through said assembly.

2. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said body structure with each electrode engaging a different one of said seating surfaces; coolant circulating means provided in said assembly; and means connecting opposite ends of said coolant circulating means to said passage means at zones spaced longitudinally of the latter for circulation of coolant through said assembly.

3. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said body structure with each electrode engaging a different one of said seating surfaces; coolant circulating means provided in said assembly; means, including passages through each of said seating surfaces, connecting opposite ends of said coolant circulating means to said passage means for circulation of coolant through said assembly.

4. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said body structure with each electrode engaging a different one of said seating surfaces; coolant circulating means provided in said assembly; means, including passages through each of said seating surfaces, connecting opposite ends of said coolant circulating means to said passage means at zones spaced longitudinally of the latter for circulation of coolant through said assembly.

5. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said body structure with each electrode engaging a different one of said seating surfaces; coolant circulating means provided in said assembly; means connecting opposite ends of said coolant circulating means to said passage means at zones spaced longitudinally of the latter for circulation of coolant through said assembly; and flow restricting means in said passage means between said zones.

6. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said body structure with each electrode engaging a different one of said seating surfaces; coolant circulating means provided in said assembly; means, including passages through each of said seating surfaces, connecting opposite ends of said coolant circulating means to said passage means at zones spaced longitudinally of the latter for circulation of coolant through said assembly; and flow restricting means in said passage means between said zones.

7. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said structure with each electrode engaging a different one of said seating surfaces; passages through each of said seating surfaces communicating with said passage means; a circumferential channel in the inner periphery of each electrode communicating with the radial passages in its respective seating surface; and coolant circulating means provided in said assembly and extending between said circumferential channels.

8. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said structure with each electrode engaging a different one of said seating surfaces; passages through each of said seating surfaces communicating with said passage means, the passages through the respective seating surfaces communicating with said passage means; a circumferential channel in the inner periphery of each electrode communicating with the radial passages in its respective seating surface; and coolant circulating means provided in said assembly and extending between said circumferential channels.

9. A rotary seam welding transformer having a secondary including a substantially cylindrical, axially elongated, electrically conductive body structure with a pair of axially adjacent electrode seating surfaces on its outer periphery electrically isolated from each other; passage means extending longitudinally through said body structure for the circulation of liquid coolant therethrough; an electrode assembly including a pair of annular electrically conductive electrodes secured together in coaxial relation with an annular dielectric disk therebetween; means securing said assembly on said structure with each electrode engaging a different one of said seating surfaces; passages through each of said seating surfaces communicating with said passage means, the passages through the respective seating surfaces communicating with said passage means; a circumferential channel in the inner periphery of each electrode communicating with the radial passages in its respective seating surface; coolant circulating means provided in said assembly and extending between said circumferential channels; and flow restricting means in said passage means between said zones.

10. A rotary seam welding transformer as claimed in claim 7 in which the axial widths of said circumferential channels is substantially greater than the diameters of said passages.

11. A rotary seam welding transformer as claimed in claim 9 in which said coolant circulating means comprises correspondingly located circular channels in the facing surfaces of said electrodes connected to said circumferential channels, radial channels in such facing surfaces connected to said circular channels, and apertures in said disk interconnecting correspondingly located channels in the facing surfaces of the two electrodes.

12. A rotary seam welding transformer as claimed in claim 9 in which said coolant circulating means comprises correspondingly located inner and outer circular channels in the facing surfaces of said electrodes, the inner circular channels being connected to said circumferential channels, radial channels in such facing surfaces interconnecting said circular channels, and apertures in said disk interconnecting the outer circular channels of the two electrodes.

References Cited in the file of this patent

UNITED STATES PATENTS 2,666,121     Allardt _____ Jan. 12, 1954